US007683808B2

(12) United States Patent
Miyamoto et al.

(10) Patent No.: US 7,683,808 B2
(45) Date of Patent: Mar. 23, 2010

(54) INFORMATION PROCESSING APPARATUS AND INFORMATION PROCESSING SYSTEM

(75) Inventors: Hiroki Miyamoto, Fujisawa (JP);
Masato Suzuki, Yokohama (JP);
Yoshinori Musha, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 12/196,694

(22) Filed: Aug. 22, 2008

(65) Prior Publication Data

US 2009/0066544 A1 Mar. 12, 2009

Related U.S. Application Data

(63) Continuation of application No. 11/646,390, filed on Dec. 28, 2006, now Pat. No. 7,432,832.

(30) Foreign Application Priority Data

Jan. 12, 2006 (JP) .............................. 2006-005315

(51) Int. Cl.
*H03M 7/34* (2006.01)
(52) U.S. Cl. .......................... 341/51; 386/112; 709/231
(58) Field of Classification Search ............. 341/50–60; 386/112; 709/231, 246, 249; 375/240.06
See application file for complete search history.

(56) References Cited

U.S. PATENT DOCUMENTS 6,407,680 B1* 6/2002 Lai et al. ....................... 341/50
6,463,445 B1 10/2002 Suzuki et al.
6,593,860 B2* 7/2003 Lai et al. ....................... 341/50
7,590,759 B2* 9/2009 Omar et al. ................. 709/246
2005/0198448 A1 9/2005 Fevrier et al.

FOREIGN PATENT DOCUMENTS

JP 2002-374317 12/2002
JP 2004-159079 6/2004

OTHER PUBLICATIONS

Derwent 2005-608189, Sep. 2005.

* cited by examiner

*Primary Examiner*—Lam T Mai
(74) *Attorney, Agent, or Firm*—Antonelli, Terry, Stout & Kraus, LLP.

(57) ABSTRACT

For providing a user a plural number of trans-coding services with using a plural number of trans-coding services, at high speed, within a home network environment, an information processing apparatus is provided with a function of providing a list of formats, on which format conversion can be made, to a home server, and a function of managing the format conversion processes with using process identifiers, which are shared in common with the server and the information processing apparatus, each of the process identifiers being tied with information of a format conversion method, wherein the format conversion is executed upon a part of contents divided within the home server, following the process identifier designated by the home server, to grasp performances of the information processing apparatuses by measuring throughput per a unit time in the format conversion, and an adjustment is made on an amount of data to be transferred from the home server to the information processing apparatus in the next time, thereby enabling high speed processing of the format conversions.

9 Claims, 5 Drawing Sheets

1 TRANS-CODING SYSTEM

FIG.3
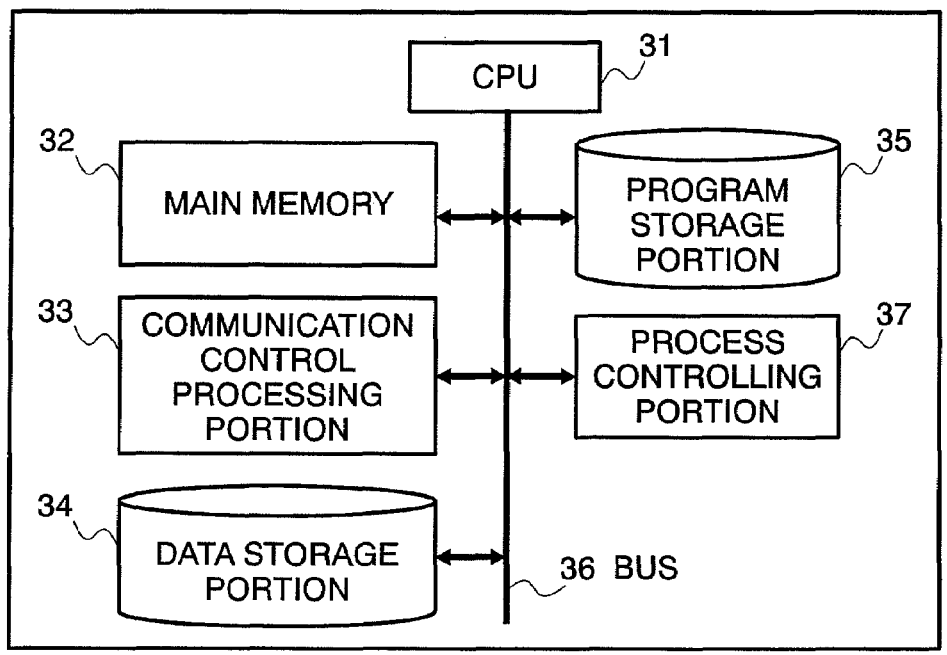
FIG.4
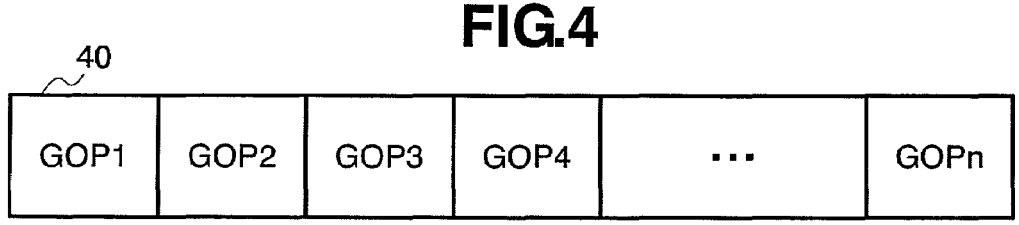
FIG.5
| SEQUENCE ID | GOP HEAD POSITION | GOP NUMBER | PROCESSING TIME | CONDITION | FILE ID |
|---|---|---|---|---|---|
| 1 | 0 | 5 |  | DISTRIBUTED | 0001_1_0 |
| 2 | 1400000 | 3 | 17 | PROCESSED | 0001_2_0 |
| 3 | 2820000 | 8 |  | DISTRIBUTED | 0001_3_0 |
| 4 | 7345205 | 6 |  | NOT PROCESSED | 0001_4_0 |
| 1 | 0 | 3 | 20 | PROCESSED | 0001_1_1 |
100 PROCESS MANAGEMENT TABLE

FIG.6

| PROCESS ID (205) | PRE-CONVERSION FORMAT (210) | POST-CONVERSION FORMAT (215) |
|---|---|---|
| 0001 | MULTIPLEXING:MPEG2-PS<br>VideoFormat:MPEG2<br>bps:648000<br>fps:30<br>Progressive:no<br>Width:640<br>Height:480<br>AudioFormat:MPEG2-AAC | MULTIPLEXING:MPEG4-FF<br>VideoFormat:MPEG4-Video<br>bps:128000<br>fps:10<br>Progressive:no<br>Width:320<br>Height:240<br>AudioFormat:AMR |

200 FORMAT CONVERSION TABLE

INFORMATION PROCESSING APPARATUS AND INFORMATION PROCESSING SYSTEM

CROSS REFERENCE TO RELATED APPLICATION

This is a continuation of U.S. application Ser. No. 11/646,390, filed Dec. 28, 2006 now U.S. Pat. No. 7,432,832. This application relates to and claims priority from Japanese Patent Application No. 2006-005315, filed on Jan. 12, 2006. The entirety of the contents and subject matter of all of the above is incorporated herein by reference.

BACKGROUND OF THE INVENTION

The present invention relates to a technology for communicating data among a plural number of information processing apparatuses through a communication network.

Through a home network located within a house being built up with using communication means therein, such as, a wired LAN or a wireless LAN or the like, it is possible to view digital contents of pictures, which are stored in a STB (Set Top Box) and/or a device, such as, on other STB or other PC. Also, other than the method of passing through such a network, through a bridge medium, such as, a SD (Secure Digital) card or the like, it is possible to view the digital contents on a PDA (Personal Digital Assistants) and a portable telephone (a mobile phone).

Various decoders are provided, being different in the kind thereof, depending on the resolution of a screen, the processing power, and/or the size of a memory, etc., which are provided in the device; i.e., many kinds of methods for compression and coding is installed into a PC having high resolution and high processing power, while into the mobile phone having a display screen of QVGA (Quarter Video Graphics Array) is installed a compression/coding method of high compression, for reducing the data size of digital contents, such as MPEG-4 (Moving Picture Expert Group-4), etc., to be small.

In this manner, since the reproducible moving pictures differs in the format thereof, depending on the kinds of terminals, there is necessity of converting the contents thereof for achieving common use of the contents between the terminals. Such the conversion on the formant of moving pictures is called by "trans-coding".

Generally, the trans-coding is executed within one (1) set of a processing apparatus, in many cases, which installs software or hardware having capacity of the trans-coding. However, since the contents themselves are large in the data size, and further large in the throughput thereof, it takes a very long time until when the process is completed, in particular, for the processing apparatus installing therein no hardware for the exclusive use thereof, but depending on the processing speed of a CPU and/or the size of a memory.

Then, studies were made upon a technology of executing the trans-coding within a short time-period, through executing the trans-coding in parallel upon the contents divided by a certain unit for processing, with using a plural number of processing apparatuses therein. In this, the contents of MPEG are divided into a unit of data block, being called by "sequence", and the data blocks are transferred to the plural number of processing apparatuses, thereby executing the trans-coding thereon in parallel (for example, Patent Document 1).

Also, there is already know a technology of installing a distribution function and a trans-coding function in each of the apparatuses on the network, for the purpose of conducting the trans-coding on a plural number of streams, thereby distributing the data streams to the most suitable processing apparatus, by taking into the consideration thereof the processing performance and the format to be converted (for example, Patent Document 2).

[Patent Document 1] Japanese Patent Laying-Open No. 2004-159079 (page 7 and FIG. 4); and

[Patent Document 2] Japanese Patent Laying-Open No. 2002-374317 (page 9 and FIG. 14).

SUMMARY OF THE INVENTION

However, in the home network environment, for a HDD, a TV, etc., corresponding to the processing apparatus, the main processing thereof are the followings; i.e., being used for a user to view a program recorded on each of the processing apparatuses, or to view or record a program broadcasted on the TV. But, use of the processing apparatus in the remote with using the network should be made within such a region that no ill influence is given onto the user who is directly operating the processing apparatus. In particular, when processing a high load, such as, the trans-coding, there is necessity of conducting a control on the load to be processed, so that it does not make full use of the CPU and/or the memory, while making confirmation on time when no user uses the processing apparatus or a situation of processing thereof.

For that purpose, there is necessity of providing processing performances of the processing apparatus for executing the processes and the present processing load, in case when executing parallel processing with using the network, and a device for enabling to join into distributed trans-coding processes, instantaneously, when completing the process executed at present. Also, in many cases, the home network has a relatively small-scaled construction of equipments, however if trying to apply therein, such a system of transmitting the stream to a processing apparatus, enabling the trans-coding therein, with using distributing function, so as to execute the trans-coding on one (1) content by means of one (1) set of the processing apparatus, although it is suitable for conducting the trans-coding upon the plural number of streams, simultaneously, within a large system, but it results in a system unfitted to the home network system for processing one (1) content at high speed.

Then, as an aspect of the present invention, it is an object to provide a system, a management server, and/or a processing apparatus for distributing processes, depending on capacity and processing load, among the equipments connected to the home network.

According to the present invention, it is possible to provide a plural number of trans-coding services to the user, at high speed and with using a plural number of processing apparatuses, within the home network environment.

BRIEF DESCRIPTION OF THE DRAWINGS

Those and other objects, features and advantages of the present invention will become more readily apparent from the following detailed description when taken in conjunction with the accompanying drawings wherein:

FIG. 3 is a view for showing an example of the hardware constructions of a home server;

FIG. 4 is a view for showing an example of the structures of MPEG to be used therein;

FIG. 5 is a view for showing an example of the constructions of a process management table to be managed within the home server;

FIG. 6 is a view for showing an example of the structures of a format conversion table to be used within the home server and the processing apparatus;

DETAILED DESCRIPTION OF THE EMBODIMENTS

Hereinafter, embodiments according to the present invention will be fully explained by referring to the attached drawings.

Figure 1:
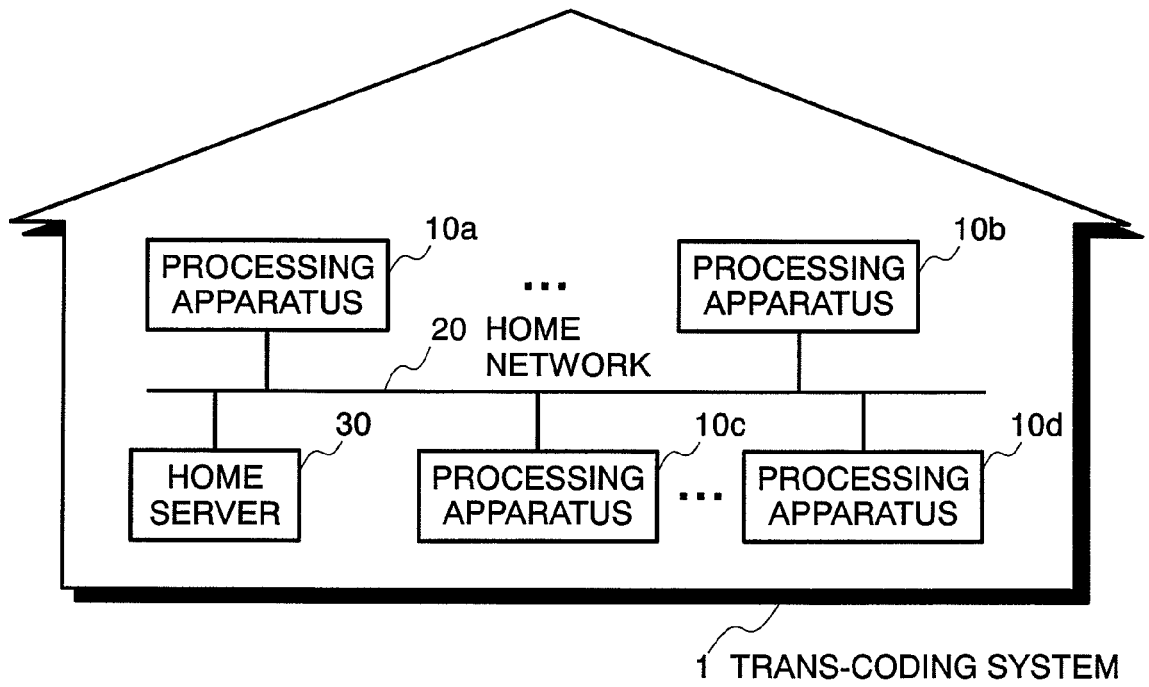
FIG. 1 is a view for showing an example of the configuration of a distributed trans-coding system.

FIG. 1 is a view for showing an example of the system configuration of a trans-coding system 1, according to an embodiment of the present invention. In this FIG. 1, a reference numeral 20 depicts a home network of connecting processing apparatuses within a home through a network, and 10 the processing apparatuses, and 30 a home server. Subscriptions are attached to the processing apparatuses 10, like, 10a, 10b, 10c and 10d, and do not mean that all of them have the same function and/or the same performance, but only for the purpose of convenience. Regarding the processing apparatuses 10, in general, they are information equipments, having the trans-coding function therein and being located within a home. The home server 30 accumulating or storing therein contents, as being a target of the trans-coding, has a function for separating MPEG into a unit GOP (Group of picture), so as to distribute them among the processing apparatuses 10. It is sufficient that the contents, as being the target of the transcoding, is accumulated or stored into the home server 30, temporarily, or the contents stored in a Media Server (not shown in the figure) within the home network 1 may be downloaded, to be used in the place thereof.

The processing apparatuses 10 are information equipments, including a PC (a Personal Computer), a HDD (a Hard Disk Drive) recorder, and/or a TV, etc., each of which can make bi-directional communication through the network. Thus, each mounts a client therein, for enabling a processing request to the equipment connected with the network, such as, RPC (Remote Procedure Call), to the processing apparatus, which is implemented with, for example, UPnP (Universal Plug and Play) and/or Jini, and with respect to a plural number of processing apparatuses having the same functions, it is possible to make control only with an aid of the client mentioned above. At the same time, it is also possible to mount a server for receiving the processing request of the client mentioned above. And, further as a function for transferring the contents, it implements protocols therein, such as, HTTP (HyperText Transfer Protocol), RTP (Real-time Transfer Protocol), RTSP (Real Time Streaming Protocol), etc., thereby having a function of transferring the contents to other processing apparatuses 10 or the home server 30.

The home network 20 connects the processing apparatuses, such as, PC, AV equipment, and/or home appliances within home, which are connected to a router (not shown in the figure), with using a wireless LAN (Local Area Network), a wired LAN (Local Area Network), bluetooth, UWB (Ultra Wide Band) therein, so that each of the information equipments can communicate data with each other. The each processing apparatus has an IP (Internet Protocol) address, and enables to use the UPnP (Universal Plug and Play) on the network. Also, it is possible to transfer the contents or a part thereof, with using a protocol, such as, HTTP, RTP, RTSP, etc.

The home server 30 is information equipment, including PC (a Personal Computer), HDD (a Hard Disk Drive) recorder or a TV, etc., which can make bi-directional communication through the network. Thus, it mounts a client therein, for enabling a processing request to the equipment connected with the network, such as, RPC (Remote Procedure Call), to the processing apparatus, which is implemented with, for example, UPnP (Universal Plug and Play) and/or Jini, and with respect to a plural number of processing apparatuses having the same functions, it is possible to make control only with an aid of the client mentioned above. At the same time, it is also possible to mount a server for receiving the processing request of the client mentioned above. And, further as a function for transferring the contents, it implements protocols therein, such as, HTTP (HyperText Transfer Protocol), RTP (Real-time Transfer Protocol), RTSP (Real Time Streaming Protocol), etc., thereby having a function of transferring the contents to the processing apparatus 10 or a program, which is mounted within the same housing thereof.

The trans-coding system, which will be explained as the present embodiment, divides the contents stored within the home server 30 into a unit of GOP, with using the equipments mentioned above, and executes the processing request of the trans-coding to the processing apparatuses 10 with using the UPnP, wherein the number of GOP to be transferred to the processing apparatus 10 is increased or decreased, fitting to the performance and/or the condition of processing load of the processing apparatus 10, and further it enables to execute a plural number of trans-coding processes through managing process identifiers.

Figure 2:
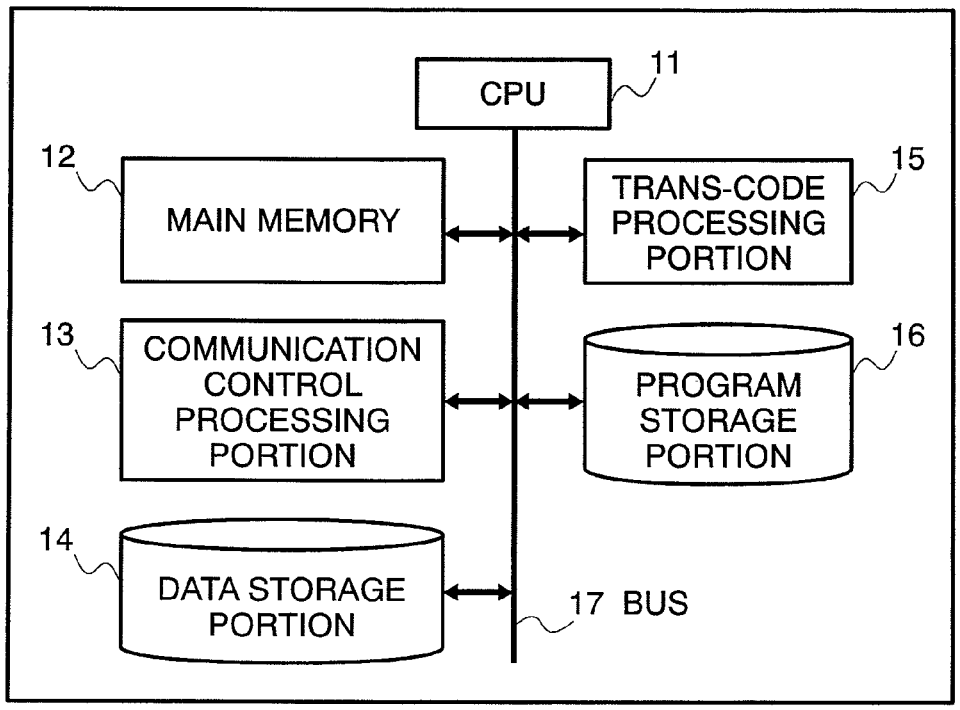
FIG. 2 is a view for showing an example of the hardware constructions of the processing apparatus.

FIG. 2 is a hardware construction view of the processing apparatus, into which the present embodiment can be applied. As is shown in this FIG. 2, the processing apparatus 10 comprises a CPU (Central Processing Unit) 11, a main memory 12, a communication control processing portion 13, a data storage portion 14, a trans-code processing portion 15 and a program storage portion 16. And, each of the constituent elements of the processing apparatus 10 is connected with one another through a bus 17, so that necessary information can be transmitted among the constituent elements in that structure.

The CPU 11 executes a predetermined operation in accordance with the program(s), which is/are stored within the main memory 12 and/or the program storage portion 16 in advance.

The main memory 12 is means for functioning to a work area or for storing a necessary program(s) therein, and can be achieved by, for example, a RAM (Random Access Memory) for the former, and a ROM (Read Only Memory) for the latter, etc.

The communication control processing portion 13 is the structures for transmitting data with the apparatuses, which are connected with the home network 20, through the same, and can be achieved by, for example, a modem, a network adaptor, a wireless transmitting apparatus, etc.

The data storage portion 14 is the structures for storing the contents therein, and can be achieved by, for example, a HDD, an optical disk, a Flash memory, etc.

The trans-code processing portion 15 has a function of trans-coding the contents, and it is implemented with software or hardware. It can convert a part of the contents transmitted from the home server 30 into a format, which is indicated from the home server 30. In case when it is implemented with the software, the process may be executed with using the CPU 11, while extending the program locating within the trans-code processing portion 15 onto the main memory 12, or separating from the CPU 11, a CPU and/or a memory may be installed for use of that trans-coding, or only a CPU may be installed with using the main memory 12 provided on a side the host. Or, in case of being implemented with the hardware therein, the process may be executed with using the main memory 12.

The program storage portion 16 is means for reserving the program(s) for controlling the operation of the processing apparatus 10, and it can be achieved by, such as, a HDD, an Optical disk, a Flash memory, etc. Middle software, such as, UPnP and Jini, etc., and/or binary data of an application are stored therein, and that middle ware and/or the application are/is extended on the main memory 12, so as to be operated on the CPU 11.

FIG. 3 is the hardware structure view of the home server 30, into which the present embodiment can be applied. As is shown in this FIG. 3, the home server 30 comprises a CPU (Central Processing Unit) 31, a main memory 32, a communication control processing portion 33, a data storage portion 34 and a program storage portion 35. And, each of the constituent elements of the home server 30 is connected with one another through a bus 36, so that necessary information can be transmitted among the constituent elements in that structure.

The CPU 31 executes a predetermined operation(s) in accordance with a program(s), which is/are stored within the main memory 32 and/or the program storage portion 35 in advance.

The main memory 32 is means for functioning to a work area or for storing a necessary program(s) therein, and can be achieved by, for example, a RAM (Random Access Memory) for the former, and a ROM (Read Only Memory) for the latter, etc.

The communication control processing portion 33 is the structures for transmitting data with the apparatuses, which are connected with the home network 20, through the same, and can be achieved by, for example, a modem, a network adaptor, a wireless transmitting apparatus, etc.

The data storage portion 34 is the structures for storing the contents therein, and can be achieved by, for example, a HDD, an optical disk, a Flash memory, etc.

The program storage portion 35 is means for reserving the program(s) for controlling the operation of the home server 30, and it can be achieved by, such as, a HDD, an Optical disk, a Flash memory, etc. Middle software, such as, UPnP and Jini, etc., and/or binary data of an application are stored therein, and that middle ware and/or the application are/is extended on the main memory 32, so as to be operated on the CPU 31.

The process controlling portion 37 controls the processing apparatuses locating on the network, integrally. It is implemented with software or hardware therein.

Also, within the same housing of the home server 30 may be implemented the function of the processing apparatus at the same time, and in that case, the same function to that of the trans-code processing portion 15 is implemented therein. It is assumed that the home server 30, as far as it is implemented within the same housing, can be treated to be equal to other processing apparatus 10, which is connected through the network.

FIG. 4 is an example of the constructions of MPEG data, as being a format of moving picture. MPEG contents is constructed with one (1) or more of GOP (Group Of Pictures), and further each GOP is constructed with a plural number of frames. GOP is kept to be independent from other GOP within the contents, and it is possible to reproduce the picture for each frame, which a single GOP manages. The contents are made up with one (1) or more of continuous GOPs. Although differing from depending on the frame structures within GOP, one (1) of those GOPs is made of a picture of about 0.5 second, and with the distributed trans-coding according to the present embodiment, the home server 30 distributes processing capacities of the plural number of GOPs to the processing apparatuses, by a unit of GOP, while taking the processing capacity thereof into the consideration. By adopting GOP short in data length to be a unit, it is easy to increase or decrease a GOP number, and it also enables quick distribution of processes, when other processing apparatus 10 newly joins into the processing.

FIG. 5 is an example of structures of a process management table 100. The process management table 100 is extended on the main memory 12 of the home server 30, and it is a table for managing the distributed trans-coding processes. The process management table 100 comprises a sequence ID 105, a GOP starting position 110, a GOP number 115, a processing time 120, a condition 125, and a file ID 130. The sequence ID 105 is a sequence numeral attached to a block of a plural number of GOPs, which are distributed to the processing apparatus 10. According to the present embodiment, when the home server 30 distributes the GOPs to the apparatuses 10, it change the number of GOPs to be transmitted, fitting to the processing capacity of the processing apparatus 10, but as a group of GOPs to be transmitted, selection is made on continuous GOPs with respect to the contents. For that reason, combining the groups of GOPs, while aligning them in an order of the sequence numerals thereof, enables to produce the contents same to that of the contents of a source.

This sequence ID 105 is also attached to the file ID 130, which will be mentioned later, and it comes to be a name of the group of GOPs after the trans-coding, to be used when combining the groups of GOPs after the trans-coding. The GOP head position 110 describes therein a head position address of GOP to be transmitted to the processing apparatus 10. The GOP number 115 is a number of GOPs from the GOP head position 110, which are transmitted to the processing apparatus 10. The processing time 120 is a time-period from when executing the processing request to the processing apparatus 10 until when the processing apparatus 10 receiving that processing request sends a notice of completion of the trans-coding process.

The condition 125 is an area where registrations are made on whether the GOP group corresponding to the sequence ID 105 is already distributed or not, to the processing apparatus 10 locating on the home network 20, on whether the process is already completed or not on the processing thereof, on whether the distribution process is conducted or not yet, on whether it is already timeout or not, and/or on whether redistributing process is conducted or not. The file ID 130 is an ID, to be transmitted as the file name, at the same time when the GOP group after the trans-coding is transmitted to the home server 30. The home server 30 accumulates or stores the GOP group after processing and also the file ID 130 received at the same time, to be the file name of the GOP group mentioned above, into the data storage portion 34 within the home server 30.

FIG. 6 shows an example of the structures of a format conversion table 200. The format conversion table 200 is a table to be transmitted from the home server 30 to the processing apparatus 10, when conducting an initializing process, and it describes therein format information of the contents on a target, on which the trans-coding should be done, and format information after the trans-coding. As the constituent elements thereof are an process ID for discriminating the trans-coding process, a pre-conversion format 210, and a post-conversion format 215. This table is treated as a table, from a viewpoint of convenience, however when it is transmitted, it may be changed into a format, such as, XML (extensible Markup Language) or CSV (Comma Separated Values) to be easily treated with UPnP or the like, or a combination of them.

Next, an initializing process according to the present embodiment will be explained, by referring to the drawings.

Figure 7:
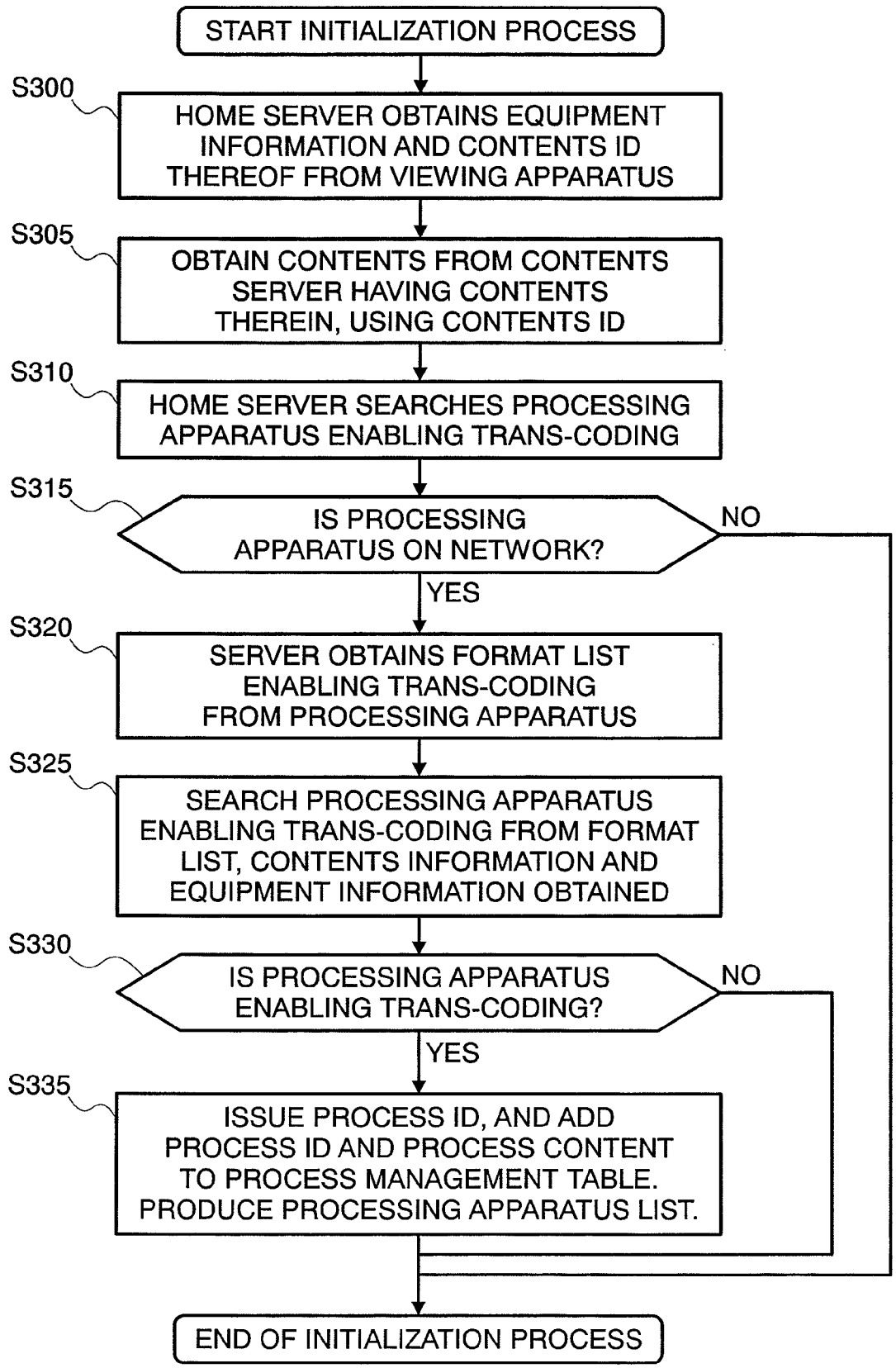
FIG. 7 is a view for showing an example of flow of initializing processes.

FIG. 7 shows a method of the initializing process before executing the distributed trans-coding. First of all, in a step S300, from the viewing apparatus, on which a user views the contents, the equipment information of that viewing apparatus (resolution, screen size, corresponding format, etc.) and information o the contents to be viewed (for example, the contents ID and/or URI (Uniform Resource Identifier) for discriminating the contents are transmitted to the home server 30. As a presumption, the viewing apparatus obtained therein a list of contents, from a contents server, which is located within the home or in an outside thereof, therefore having the contents information therein.

In a step S305, when obtaining the equipment information and the contents information, the home server 30 downloads the contents upon basis of the contents information, so as to store them into the data storage portion 34. In addition thereto, it obtains detailed information of the contents from the contents server, or it analyze them when downloading the contents, so as to obtain them.

In a step S310, the home server 30 searches the processing apparatus of providing the trans-coding service, being located on the network 20, with using UPnP, etc. In case where no such desired processing apparatus 10 can be found, as a result of the search, a fact that the trans-coding cannot be done is noticed to the user who is operation the viewing apparatus, through the network and with using the communication control processing portion 33. In this instance, error information may be notices in the form of a return value when transmitting the equipment information and the contents information, or it may be stored into the data storage portion 34 within the home server 30, to be noticed on the viewing apparatus as the error information when the viewing apparatus joins into the home network 20. As a method for noticing, an E-mail may be also applied for.

In a step 315, in case where no desired processing apparatus can be found as the result of the step S310, the initializing process is finished. If such desired processing apparatus be found as the result of the step S310, then the process moves into a step S320.

In the step 320, obtaining is made on a function list of the trans-coding service, which the found processing apparatus 10 has, and further on a format list, on which the trans-coding can be made. The format list includes, at least, a multiplexing method, Video format, Audio format, and a screen size, and the processing apparatus lists up all of items, which can be combined with, and transmitted them to the home server 30.

In a step S325, from the format list obtained in the step S320, including the formats on which the trans-format can be made within each the processing apparatus 10, search is made on the combinations, on which the conversion can be made, with using pre-conversion contents format to be the contents information of the contents, which the user wishes while post-conversion contents to be the format of the contents, which can be deal with the equipment information of the viewing apparatus. In a step S330, if in case where no corresponding processing apparatus 10 can be found as the result of the search in the step S325, the fact that the trans-coding cannot be made to the home server 30, and the home server 30 gives a notice to the user who is operating the viewing apparatus, with using the communication control processing portion 33. If such desired processing apparatus be found, then the process moves into a step S335.

In the step S335, the home server 30 issues the process ID 205 for managing the trans-coding process, and produces the format conversion table 200 and the process management table 100 and the list of the processing apparatus(es), which can execute the trans-coding, to be stored into the main memory 32 with reference to the process ID 205. Further, the format conversion table 200 and the process ID 205 are transmitted to the processing apparatus 10, which can execute the trans-coding process therein. When receiving the format conversion table 200 and the process ID 205, the processing apparatus 10 memorizes them into the main memory 12 with reference thereto. The format conversion table 200 and the process management table 100 are prepared for each process ID. The format conversion table 200 is produced upon basis of the search result of combination, which is searched in the step S325, and the process management table 100 is produced upon basis of the contents information.

Next, operations of the present embodiment will be explained by referring to figure attached.

Figure 8:
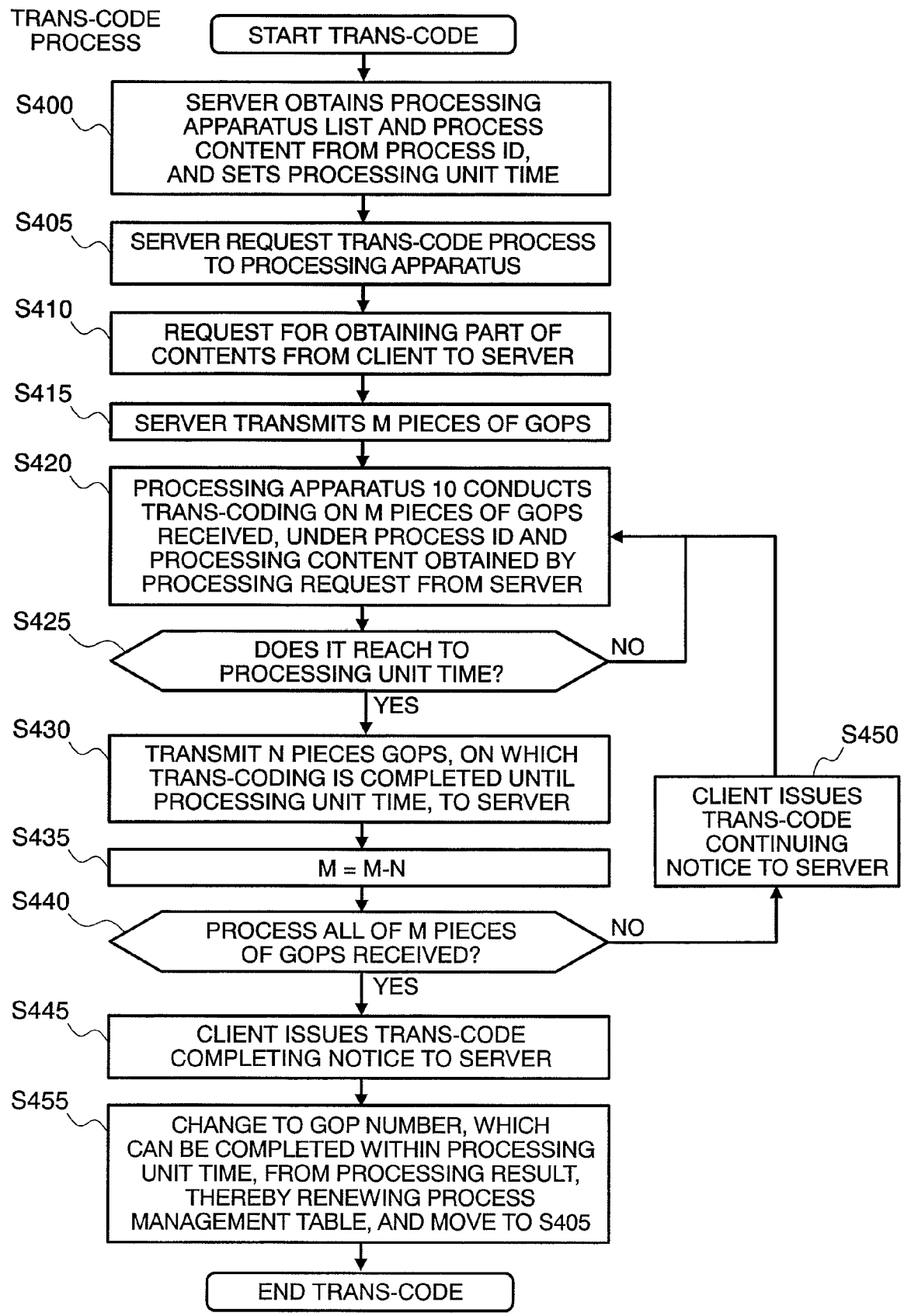
FIG. 8 is a view for showing an example of flow of operations.

FIG. 8 shows a processing method when executing the distributed trans-code process.

In a step S400, upon receipt of the initialization processing shown in FIG. 7, the list of the processing apparatuses 10 tied with the process ID 205 issued, the format conversion table 200 and the process management table 100 are obtained. Also, further a processing unit time and an initializing GOP number are set up. The processing unit time is a kind of time-out value, i.e., after the processing request is made from the home server 30 to the processing apparatus 10, those for the GOP numbers, on which the trans-coding process is finished, are sent to the home server after elapsing that processing unit time, and further a continuation notice is issued through UPnP. After the continuation notice, the processing apparatus 10 executes the processing for GOPs, on which the trans-coding process is not yet finished, and further, after elapsing the processing unit time after the continuation notice, it transmits GOPs to the home server 30, on which the processing is finished. If the processing of GOP is finished before that processing unit time, GOP finished with processing is transmitted to the home server 30, before it does not reach to the processing unit time. The reason of providing the processing unit time lies in that an assumption is made that each the processing apparatus 10 be a home appliance, then possibility must be considered, such as, unexpected shutdown of an electric source thereof and/or sudden pull-out of a network cable. For that reason, it is effective to transmit the process (es) to the home server 30 if finishing within at least the processing unit time, as the result thereof. Details of the processing method will be explained after explanation of a step S405.

In a step S405, with using UPnP, etc., the home server 30 makes a processing request for trans-coding, to the processing apparatus 10 on the list of the processing apparatuses. Within the processing request, in addition to the process ID 205 and the sequence ID 105, there are described URI of contents and the processing unit time. In this instance, on the process management table 100 are described the sequence ID 105, the GOP head position 110 and the GOP number 115, additionally. By the way, the GOP number to be transmitted firstly to the processing apparatus 10 is an initial GOP number, i.e., "M" pieces.

In a step S410, when receiving the processing request, the processing apparatus 10 makes access to URI of contents, and thereby transmitting the process ID 205 and the sequence ID 105 thereto. The home server 30, when receiving the request of obtaining contents, the process ID 205 and the sequence ID 105, transmits the initial GOP number "M", and thereby renewing the process management table 100 (a step S415). Thus, it turns the condition 125 into "distributed". In a step S420, the processing apparatus 10 obtain the format conversion table 200 locating in the main memory 12, and execute the trans-coding process onto a group of GOPs obtained from the server 30.

In a step S425, the processing apparatus confirm the elapse of the processing unit time therein. If it does not reach to the processing unit time, it continues the trans-coding process. If it reaches to the processing unit time, the process moves into a step S430.

In the step S430, "N" number of GOPs, which are finished until reaching to the processing unit time, are transmitted to the home server 30. Into the data storage portion 34 of the home server 30 are stored the process ID and the sequence ID and a number of repeating the processing unit time to be a file name.

In a step S435, subtracting is made on GOP number "N", which are processed with the processing unit time, from GOP number "M" received, and a result thereof is putted into "M".

In the step S440, in case where GOP number is equal or greater than "0", it is determined that there is/are GPO(s) which cannot be processed within the processing unit time, and then the process of the trans-coding is continued. In case where GOP number is equal to "0", it is determined that all GOPs received are processed, and then the process moves into a step S445.

In the step S445, the processing apparatus 10 transmits an end process notice to the home server 30, adding the process ID 205 and the sequence ID 105 with using UPnP. The home server 30 renews the process management table 100, and changes the condition 125 into "processed", and further it changes the data name after processing, which is transmitted from the processing apparatus 10, into a file ID 130.

In a step S450, while continuing the trans-coding process, a process continuing notice is transmitted to the home server, being attached with the process ID 205 and the sequence ID 105.

In a step S455, the home server 30 makes determination from the processing result of the processing apparatus 10, so as to change GOP number "M" into the GOP number, which can be finished within the processing unit time, and add the next process onto the process management table 100, thereby moving into the step S405.

From the above, it is possible to change the GOP number to be requested for processing, fitting to the performances and the load condition of the processing apparatus 10, and with management of the process ID 205, and with processing them in plural numbers thereof per the process ID 205, it is possible to construct the distributed trans-coding system suitable to the home network.

With the present embodiment, another explanation may be made as below.

The processing apparatuses 10 and the home server 30 have communication portions for transmitting data through a communication network, such as, the wired LAN, wireless LAN, bluetooth, or an electric power line.

The processing apparatus 10 provides the list of formats, on which the trans-coding can be made, for the format before trans-coding and the format after trans-coding, to the home server 30 managing the processing apparatus 10, with using the communication portion.

The home server 30 selects a pair of the formats from the list of format, which is provided by the processing apparatus 10, and further transmits the contents of the formats before trans-coding in the pair, with using the communication portion.

The home server 30 distributes the process identifier for each of format conversion processes.

The processing apparatus 10 executes the format conversion, with using the process identifies, which are distributed by the home server.

The processing apparatus 10, receiving a plural number of continuous groups of GOPs, being included within one (1) contents, executes the format conversion upon GOPs within the processing time, which is set up by the home server 30, and further, it returns a number of GOPs to the home server 30, being equal to or less than that of the GOP groups obtained, with respect to GOPs, upon which it can execute the format conversion within the processing time set up.

The processing apparatus 10 conducts the format conversion, continuously, upon the plural number of continuous GOP groups, which are not yet processed within the processing time set up, even after elapsing that processing time set up, and it turns the GOP groups, on which the format conversion can be made within the next set-up processing time, back to the home server.

The processing apparatus 10, managing the format conversion information, describing therein the process identifiers, which are designated by the home server, and the formats of contents before conversion and the formats of contents after conversion, searches for the format conversion information with using the process identifiers to be utilized when obtaining the GOP groups from the server, so as to obtain the format conversion information, and thereby converting the GOP groups obtained from the home server into the format, which the home server requires.

The processing apparatus 10 accumulates or stores the data after format conversion into the home server 30, with designating the process identifiers and the file names added with the sequence IDs indicative of the order of the GOP groups.

The home server 30 obtains the list of the formats, on which the trans-coding can be made, from the processing apparatus 10, with respect to the format before trans-coding and the format after trans-coding, with utilizing the communication portion.

The home server 30 controls the format conversion processes of the plural number of information processing apparatuses by means of the process identifiers, and thereby executing the plural number of format conversion processes.

The home server 30, managing the format conversion information, describing therein the process identifiers, the formats of contents before conversion, and the formats of contents after conversion, transmits the format conversion information to a predetermined processing apparatus(es), with using the communication portion, thereby designation the method for the format conversion.

The home server 30 presumes the processing capacities or performances of the processing apparatus (es), to which the plural number of continuous GOP groups are transmitted, by knowing a number of GOPs, upon which the format conversion can be made, among the plural number of continuous GOP groups transmitted within the processing time set up.

The home server 30 adjusts the number of the continuous GOP groups to be transmitted to the processing apparatus (es) 10, and it also takes the capacities or performances of the processing apparatus(es) 10 into the consideration.

The home server 30 sets up the processing time, before transmitting the plural number of continuous GOP groups to the processing apparatus(es) 10.

The home server 30 combines the GOP groups after the conversion, which are transmitted from the processing apparatus(es) with the process identifiers describing the file names thereon, with using the sequence identifiers, and thereby procuring the contents after conversion.

According to the embodiment explained in the above, for example, it is possible to execute the plural number of format conversions, while distributing them into the processing apparatuses, and even if the format conversion process is on the way thereof, it is possible to join into the processing, or withdrawal during the processing.

However, the present invention should not be restricted only to the embodiments mentioned above, and it is of course that it is susceptible with various kinds of constructions, but not departing from the gist of the present invention.

The present embodiment mentioned above was made upon an assumption that the processing apparatuses described therein are the digital home appliances, such as, HDD recorder, PC, mobile phone, etc., and the home server is the PC, HDD recorder, etc. Also, relating to the processing contents described herein, they may be installed in the form of middle ware of the information apparatuses mentioned in the above.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A divided transcode controlling method for changing a coding method of digital contents by using a plurality of transcoders, comprising:
    transmitting transcode request information including transcode processing unit time and a number of GOPs to be processed within said transcode processing unit time;
    executing a transcode process for each GOP, in accordance with said transcode request information;
    notifying an end when the transcode process is finished within designated processing unit time; and
    updating the number of GOPs to be processed within said processing unit time, upon basis of said end.

2. The divided transcode controlling method, as described in claim 1, comprising:
    notifying the number of GOPs which are transcoded, when the transcode process is not finished at the time of reaching to the designated processing unit time; and
    changing the number of GOPs to be processed within said processing unit time, into the number of GOPs which are notified.

3. The divided transcode controlling method, as described in claim 2, wherein said transcode request information includes a sequence ID indicating an order of GOP groups which are divided; and the method comprising:
    generating digital contents, which are transcoded, by combining said group of GOPs that are transcoded, in accordance with said sequence ID.

4. The divided transcode controlling method, as described in claim 3, comprising:
    selecting a processing apparatus, which satisfies a request after obtaining transcodable format information, which is obtained from a plurality of processing apparatuses; and
    generating transcode request information in each selected processing apparatus.

5. The divided transcode controlling method, as described in claim 4, wherein said transcode request information includes said file ID, transcode processing unit time, the number of GOPs to be processed within said processing unit time, and a sequence ID, in each selected processing apparatus.

6. A divided transcode controlling method for a transcoder, for transcoding digital contents by dividing contents, with using a plurality of network-connected processing apparatuses, comprising:
    obtaining from said plurality of processing apparatuses, a list of transcodable format for a plurality of network-connected processing apparatuses;
    selecting a processing apparatus, which executes a transcode process by referring to said list of format, in accordance with a transcode request of the digital contents;
    generating a file ID, transcode processing unit time, a number of GOPs of digital contents to be processed within said transcode processing unit time, and transcode request information including a sequence ID, in each said selected processing apparatus;
    notifying said plurality of processing apparatuses of said transcode request information, so as to make a transcode processing request;
    obtaining a processing result from said plurality of processing apparatuses, which make said transcode processing request; and
    updating a number of GOPs of digital contents to be processed within processing time unit of said transcode request information, in each said processing apparatus, upon basis of said processing result in each said processing apparatus.

7. The divided transcode controlling method, as described in claim 6, comprising:
    responding the number of GOPs, which are processed, at the time of finishing the transcode process, when the transcode process of the number of GOPs of said transcode request information is finished within transcode processing unit time of said transcode request information; and
    changing the number of GOPs in the next processing request, depending on the processing status of the transcode process.

8. The divided transcode controlling method, as described in claim 7, comprising:
    responding the number of GOPs whose the transcode process is finished within transcode processing unit time, when the transcode process of the number of GOPs of said transcode request information is not finished within transcode processing unit time of said transcode request information;
    processing the number of GOPs whose the transcode process is not finished, continuously; and
    changing the number of GOPs in the next processing request, depending on the processing status of the transcode process.

9. The divided transcode controlling method, as described in claim 6, comprising:
    generating digital contents which are transcoded, by combining content data of a plurality of GOPs which are transcoded, upon basis of said transcode request information, In accordance with said sequence ID.

* * * * *